United States Patent
Milojicic et al.

(10) Patent No.: US 9,274,917 B2
(45) Date of Patent: Mar. 1, 2016

(54) PROVISIONING RESOURCES IN A FEDERATED CLOUD ENVIRONMENT

(75) Inventors: Dejan S. Milojicic, Palo Alto, CA (US); Soumendu Bardhan, Jenks, OK (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 427 days.

(21) Appl. No.: 13/561,213

(22) Filed: Jul. 30, 2012

(65) Prior Publication Data

US 2014/0032763 A1    Jan. 30, 2014

(51) Int. Cl.
*G06F 15/173* (2006.01)
*G06F 11/30* (2006.01)
*H04L 12/26* (2006.01)
*H04L 29/08* (2006.01)
*H04L 12/24* (2006.01)
*G06F 9/50* (2006.01)
*G06F 11/14* (2006.01)
*G06F 11/34* (2006.01)

(52) U.S. Cl.
CPC .......... *G06F 11/3055* (2013.01); *G06F 9/5083* (2013.01); *G06F 11/1482* (2013.01); *G06F 11/3006* (2013.01); *H04L 41/5009* (2013.01); *H04L 41/5025* (2013.01); *H04L 43/16* (2013.01); *H04L 67/1029* (2013.01); *H04L 67/1034* (2013.01); *G06F 11/3409* (2013.01); *G06F 2201/81* (2013.01); *G06F 2201/865* (2013.01); *H04L 12/2602* (2013.01)

(58) Field of Classification Search
CPC ...................... H04L 29/06; H04L 2029/06054; H04L 67/1034; H04L 41/5009; H04L 67/1029; H04L 43/16; H04L 12/2602; H04L 43/10; H04L 69/40; G06F 17/30575; G06F 2201/81; G06F 9/5083
USPC .................. 709/223, 224, 226; 707/654, 626; 718/104, 105, 1
See application file for complete search history.

(56) References Cited

U.S. PATENT DOCUMENTS

| | | | | |
|---|---|---|---|---|
| 5,951,694 | A  * | 9/1999 | Choquier et al. | 714/15 |
| 6,003,079 | A    | 12/1999 | Friedrich | |
| 6,662,195 | B1 * | 12/2003 | Langseth et al. | |
| 7,337,353 | B2 * | 2/2008 | Yamamoto et al. | 714/47.2 |
| 8,332,688 | B1 * | 12/2012 | Tompkins | 714/13 |
| 2005/0102559 | A1 * | 5/2005 | Hyytianen | G06F 11/2033 714/13 |
| 2005/0256971 | A1 * | 11/2005 | Colrain et al. | 709/238 |
| 2006/0026123 | A1 * | 2/2006 | Moore et al. | 707/2 |
| 2007/0078970 | A1 * | 4/2007 | Zabihi et al. | 709/224 |
| 2008/0046266 | A1 * | 2/2008 | Gudipalley et al. | 705/1 |
| 2008/0123559 | A1 * | 5/2008 | Haviv et al. | 370/255 |
| 2011/0078303 | A1 * | 3/2011 | Li et al. | 709/224 |
| 2011/0153727 | A1 * | 6/2011 | Li | 709/203 |

(Continued)

OTHER PUBLICATIONS www.bonfire-project.eu—EXP2: QoS-oriented Service Engineering for Federated Clouds dated on or before Jul. 27, 2012 (1 page).

(Continued)

*Primary Examiner* — Oleg Survillo
(74) *Attorney, Agent, or Firm* — Trop, Pruner & Hu, P.C.

(57) ABSTRACT

A measure of performance may be calculated for a composite cloud service of a particular cloud in a federated cloud environment. A determination may be made as to whether the measure of performance indicates breaching of a performance policy associated with the composite cloud service.

12 Claims, 6 Drawing Sheets

(56) References Cited

U.S. PATENT DOCUMENTS

| | | | |
|---|---|---|---|
| 2011/0225467 A1* | 9/2011 | Betzler et al. | 714/55 |
| 2012/0096149 A1 | 4/2012 | Sunkara | |
| 2012/0297238 A1* | 11/2012 | Watson et al. | 714/4.11 |
| 2014/0075005 A1* | 3/2014 | Tung et al. | 709/223 |

OTHER PUBLICATIONS

Panzieri, F. et al., Distributed Computing in the 21st Century: Some Aspects of Cloud Computing, 2011 (21 pages).

Chen, Z. et al., Jun. 2003, UX—An Architecture Providing QoS-Aware and Federated Support for UDDI (6 pages).

* cited by examiner

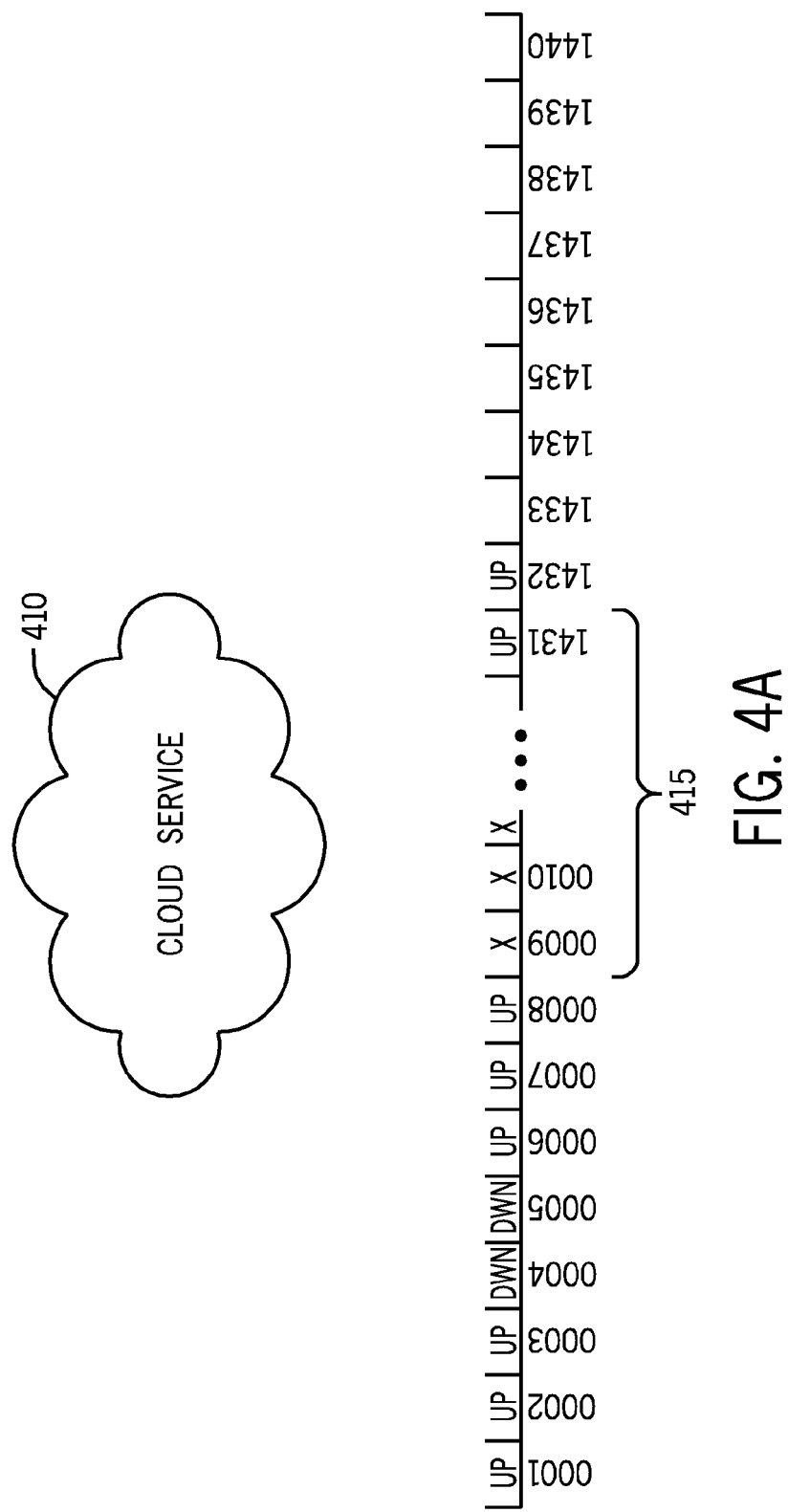

PROVISIONING RESOURCES IN A FEDERATED CLOUD ENVIRONMENT

BACKGROUND

Federated cloud environments have recently emerged as a framework for providing cloud computing services. Multiple clouds may exist within a federated cloud environment, and each cloud may offer a variety of cloud services and resources.

BRIEF DESCRIPTION OF THE DRAWINGS

Some embodiments are described with respect to the following figures:

FIG. 4A is a schematic diagram depicting a technique for calculating performance of a cloud service according to example implementations.

DETAILED DESCRIPTION

In a federated cloud environment, a particular cloud may offer a variety of services. In some instances, the particular cloud may offer a composite cloud service, which may be composed of services from the particular cloud as well as services from other clouds in the federated cloud environment. Thus, measuring performance of clouds and composite cloud services may be a complicated task in a federated cloud environment.

Figure 1A:
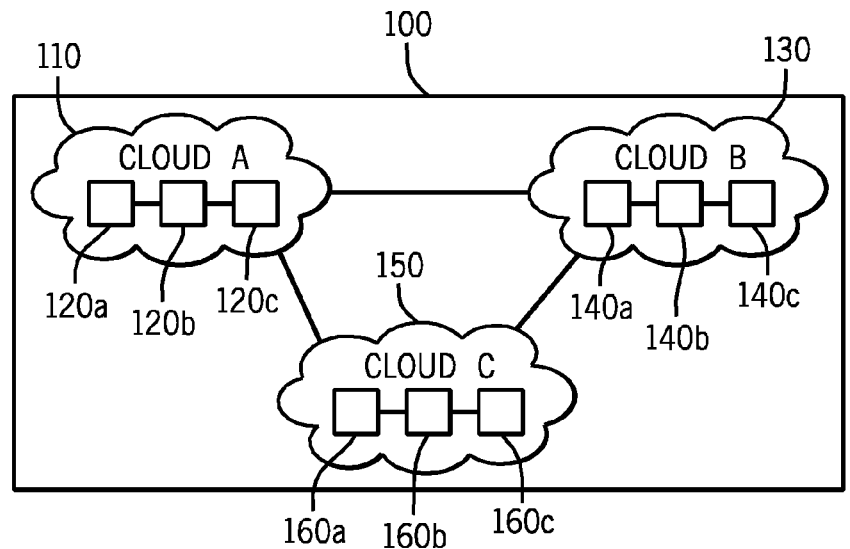
FIG. 1A is a schematic diagram of a system according to example implementations.

FIG. 1A is a schematic diagram of an example system 100 in accordance with some implementations. The system 100 may be a federated cloud environment. The federated cloud environment may include multiple clouds such as cloud A 110, cloud B 130, and cloud C 150 in communication with each other. Furthermore, each cloud may include one or more cloud services. For example, cloud A may include cloud services 120a-c, cloud B may include cloud services 140a-c, and cloud C may include cloud services 160a-c.

Each of the cloud services may be any type of service offered by the cloud to a consumer. For instance, cloud services may include database services, virtualization services, storage services, printing services, media services, publishing services, and/or any other type of computing services that can be offered by a cloud. Moreover, while FIG. 1A depicts three clouds with three cloud services each, it should be understood that the federated cloud environment may include any combination of a number of clouds and respective services.

Figure 1B:
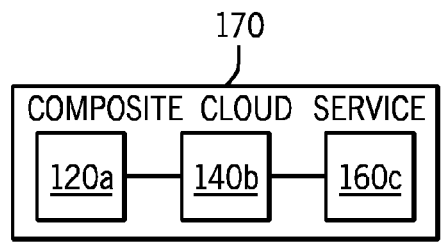
FIG. 1B is a schematic diagram of a composite cloud service according to example implementations.

FIG. 1B is a schematic diagram of an example composite cloud service 170 formed from services in cloud A, cloud B, and cloud C of the federated cloud environment depicted in FIG. 1A. The composite cloud service 170 may include cloud service 120a from cloud A 110, cloud service 140b from cloud B 130, and cloud service 160c from cloud C 150. It should be noted, however, that the composite cloud service 170 may include any combination of cloud services from any of the clouds. In addition, the composite cloud service 170 may also be hosted or supported by any of the clouds (e.g., cloud A 100, cloud B 130, or cloud C 150) in the federated cloud environment 100.

Figure 1C:
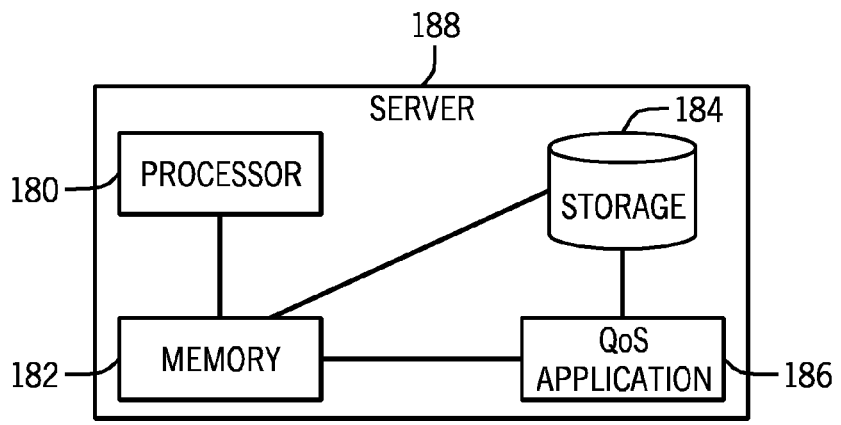
FIG. 1C is a schematic diagram of a server according to example implementations.

FIG. 1C is a schematic diagram of an example server 188 that may operate as part of the federated cloud environment 100 depicted in FIG. 1A. In some implementations, the server 188 may execute any of the cloud services offered by the clouds in the federated cloud environment 100. For instance, the server 188 may be used to execute the cloud services of cloud A 110, cloud B 130, and/or cloud C 150 and/or any combination of their respective services.

The server 188 may include a processor (or multiple processors) 180 in communication with a memory 182 and a storage 184. Additionally, the processor(s) 180 may execute instructions for a Quality of Service (QoS) application 186, which may be stored in memory 182 or the storage 184. Each composite cloud service 170 and each individual cloud service (e.g., any of cloud services 120a-c, 140a-c, 160a-c) may be associated with their own respective QoS application 186. The QoS application 186, which is described in more detail with reference to FIG. 3, may generally provide a measure of performance for its associated cloud service and may allocate resources to the cloud service based on the measure of performance.

Figure 2:
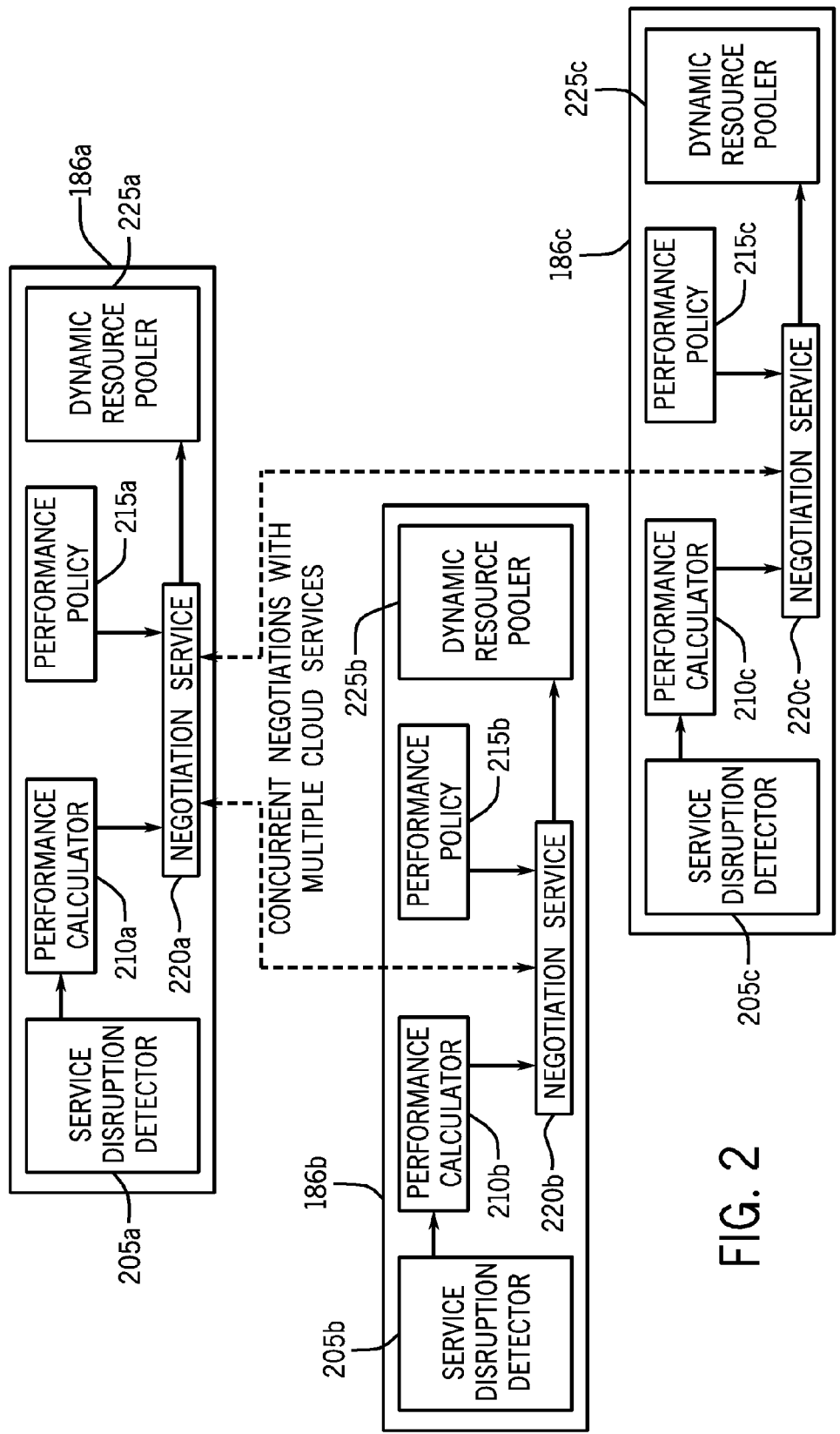
FIG. 2 is a schematic diagram of an example arrangement including quality of service applications according to example implementations.

FIG. 2 provides a schematic diagram of QoS applications 186a-c in accordance with some implementations. In some implementations, QoS application 186a may be associated with a composite cloud service (e.g. composite cloud service 170 in FIG. 1B) while QoS application 186b and QoS application 186c may be associated with individual cloud services (e.g., cloud service 120a and cloud service 140b) that make up the composite cloud service.

Each QoS application 186a-c may include a service disruption detector 205a-c to determine whether disruption has occurred for its associated cloud service. In some implementations, the service disruption detector 205a-c may continuously monitor its associated cloud service at predetermined time intervals. As such, the service disruption detector 205a-c may report to a respective performance calculator 210a-c an indication of service disruption in any time interval in which it detects a failure in the cloud service.

The performance calculator 210a-c may continuously calculate performance measurements of the associated cloud service at the predetermined time intervals. In some implementations, given n intervals that have occurred, the performance calculator 210a-c may measure the performance of the associated cloud service up to the nth interval. Such calculations may be described further with reference to FIGS. 4A and 4B below.

As used herein, the performance measured by the performance calculator 210a-c may include a state of its associated cloud service. For instance, the performance may simply measure whether its associated cloud service is functioning or available (e.g., "up") or whether it has failed (e.g., "down"). Alternatively, the performance calculator 210a-c may also measure the response time, available bandwidth, storage capacity, and/or any other attribute of its associated cloud service related to its QoS.

The QoS application 186a-c may also be associated with a respective performance policy 215a-c. In some implementations, the performance policy 215a-c may be referred to as a Service Level Agreement (SLA). Thus, the performance policy 215a-c may define a level of service to be maintained for the associated cloud service. Further, the performance policy 215a-c may be contractually agreed upon between the cloud (provides the associated cloud service) and the consumer (who uses the associated cloud service).

A negotiation service 220a-c may also be included as part of each QoS application 186a-c and may receive information from the performance calculator 210a-c and performance policy 215a-c. Based on such information, the negotiation service 220a-c may interact with other negotiation services to select an optimal cloud service with respect to QoS demands. For instance, negotiation service 220a may be associated with a composite service 170, and negotiation service 220b and 220c may be associated with other cloud services in the federated cloud environment 100. Based on performance measurements calculated by the performance calculator 210a, the negotiation service 220a may communicate with the other negotiation services 220b-c to select a particular cloud service which will satisfy the QoS demands of the performance policy 215a.

The QoS application 186a-c may also include a dynamic resource pooler 225a-c. Based on the cloud service selection made by the negotiation service 220a-c, the dynamic resource pooler 225a-c may allocate and/or deallocate resources to support the cloud service. Such allocation/deallocations may be pulled from resources local to the cloud associated with the QoS application 186a-c or may be pulled from other clouds in the federated cloud environment 100. Resources may refer to any combination of hardware and machine-readable instructions (e.g., software, firmware) that may be used to support the operation of cloud services. For example, resources may include individual processors, storage space, virtualized hardware, and/or graphical capabilities. Each cloud can include its respective set of resources.

Figure 3:
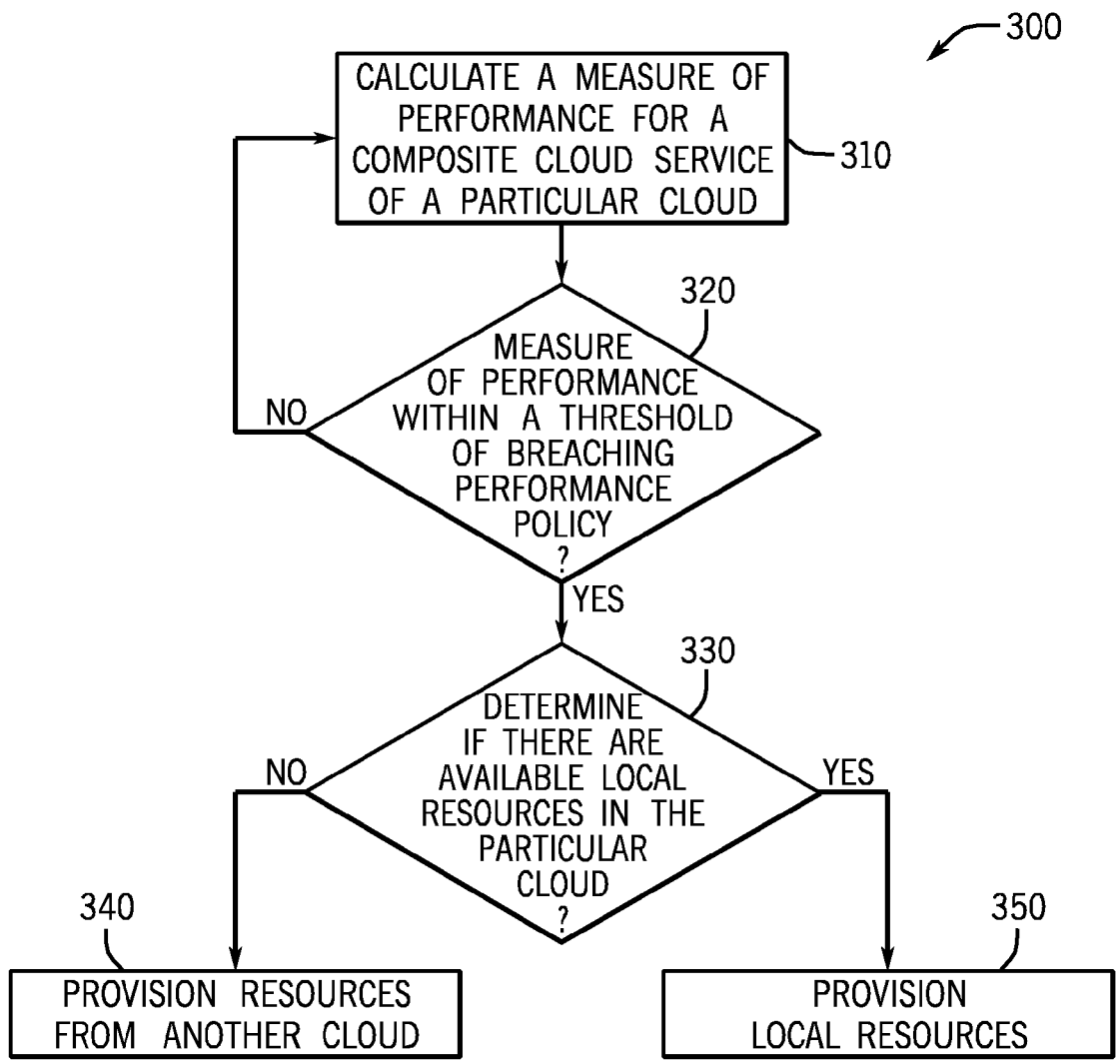
FIG. 3 is a flow diagram depicting a technique for provisioning resources according to example implementations.

FIG. 3 is a flow diagram of a method 300 for provisioning resources in a federated cloud environment. The method may begin in block 310 where a measure of performance for a composite cloud service 170 is calculated. Again, while the composite cloud service 170 may be offered by a particular cloud (e.g., cloud A 110, cloud B 130, or cloud C 150), its constituent cloud services may be pulled from different clouds though this may not be visible to the consumer. In some implementations, the performance calculation may be performed by a QoS application 186a, which may be executed by a server 188 supporting the particular cloud.

In block 320, the QoS application 186a may determine if the measure of performance falls within a threshold of breaching a performance policy 215a of the composite cloud service 170. This provides an indication that the measured performance may be in potential breach of the performance policy 215a. For example, the threshold may be defined as a performance level within 5% of a level considered to be breaching the performance policy 215a. If the measure of performance does not fall within the threshold, the QoS application 186a may continue measuring performance of the composite cloud service 170 in block 310.

If, however, the measure of performance does fall within the threshold, the QoS application 186a may determine if there are available local resources in the particular cloud in block 330. If there are no available local resources, the QoS application 186a may provision resources from another cloud in block 340. If there are available local resources, the QoS application 186a may simply provision resources from the available local resources in block 350.

FIG. 4A provides a schematic diagram for representing performance measurement for a cloud service 410. In some implementations, the performance of the cloud service 410 may be measured in terms of its availability. In other words, if the cloud service 410 is available, it may be considered UP while if it is not available, it may be considered DWN. A recording of X may indicate intervals where the consumer of the cloud service 410 does not care whether the cloud service 410 is available. It should be noted that in other implementations, measures of performance other than availability may be used.

Furthermore, a data structure 415 may be associated with each cloud service and may be accessible by each cloud service's respective QoS application. The data structure 415 may be used to represent an entire day and may be divided into intervals of one minute each for a total of 1440 minutes in a day. It should be understood, however, that the data structure 415 may represent any length of time and may be divided into any number of intervals.

Thus, as illustrated in FIG. 4A, for each minute that has occurred during a day, the QoS application 186a-c may record whether the cloud service was UP or DWN. As such, the availability (i.e., the performance) of the cloud service 410 may be calculated using the following formula:

$$\text{Availability \% up to the } N\text{th minute} = \frac{(\text{Total \# of UP minutes}) * 100}{(N - \text{\# of } X \text{ minutes})}$$

In the example provided by FIG. 4A, the availability up to the $10^{th}$ minute=(6/8)*100=75%. The calculated availability may then be compared with the performance level demanded by the performance policy 215a to determine whether the cloud service's 410 performance is near a potential breach of the performance policy 215a. If so, additional resources may be provisioned.

Figure 4B:
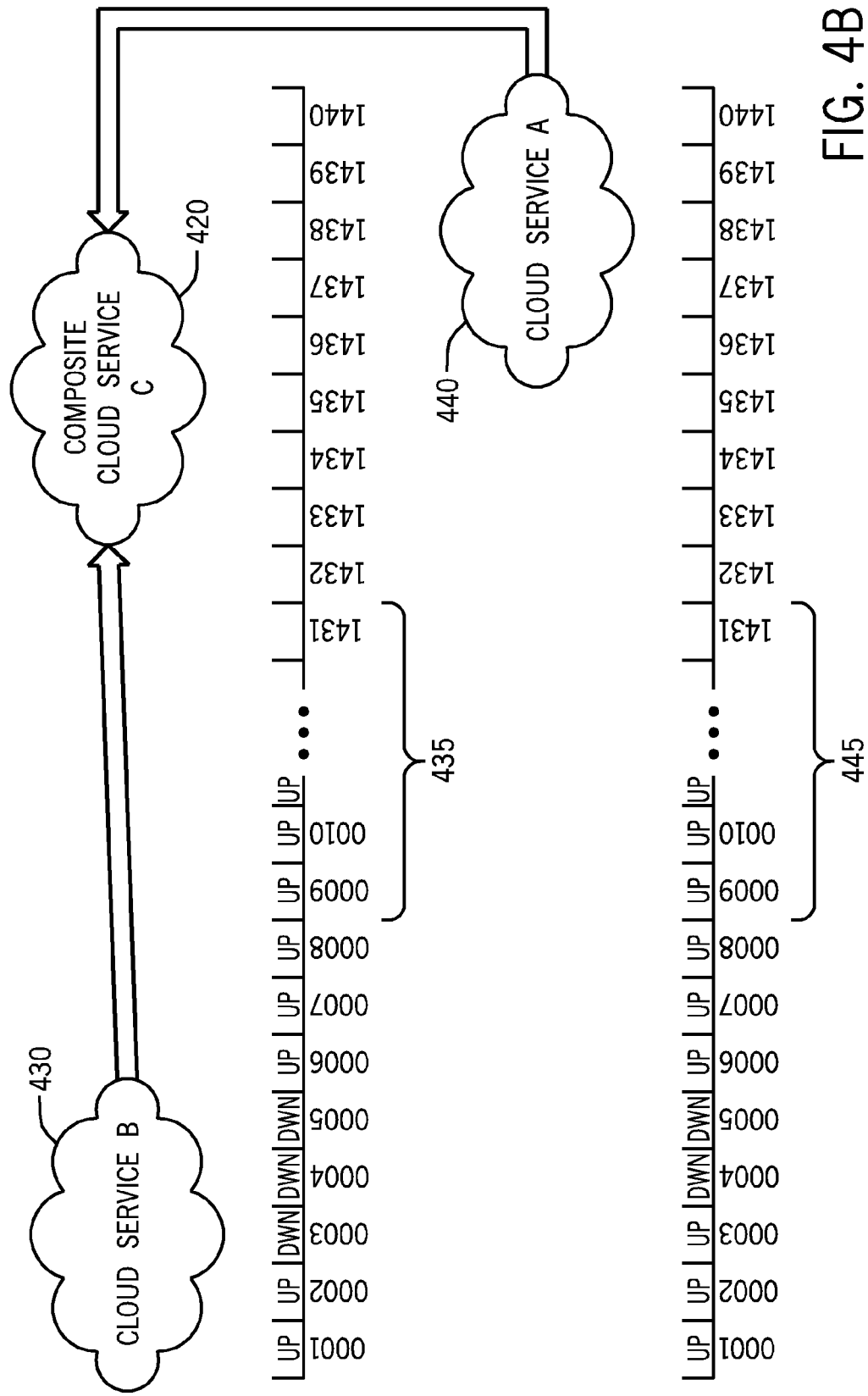
FIG. 4B is a schematic diagram depicting a technique for calculating performance of a composite cloud service according to example implementations.

FIG. 4B provides a schematic diagram for representing performance measurement for a composite cloud service represented by composite cloud service C 420. As illustrated in FIG. 4B, the composite cloud service C 420 may be composed of cloud service B 430 and cloud service A 440. Moreover, cloud service B 430 may be associated with data structure 435, and cloud service A 440 may be associated with data structure 445. Thus, the availability (i.e., the performance) of the composite cloud service C 420 may calculate with the following formula:

$$\text{Availability \% up to the } N\text{th minute} = \frac{(\text{INTERSECTION of UP minutes}) * 100}{N}$$

The INTERSECTION operation may represent the UP minutes which belong to both the cloud service A 440 and the cloud service B 430. Therefore, as illustrated in FIG. 4B, the availability of composite cloud C 420 up to the $10^{th}$ minute would be (7/10)*100=70.

In some implementations, each of composite cloud service C 420, cloud service B 430, and cloud service A 440 may be associated with respective QoS applications 186a-c. Thus, each of the constituent clouds service (cloud service B 430 and cloud service A 440) may communicate its performance to composed cloud service C 420 though their respective negotiation services 220a-c in their respective QoS applications 186a-c.

Figure 5:
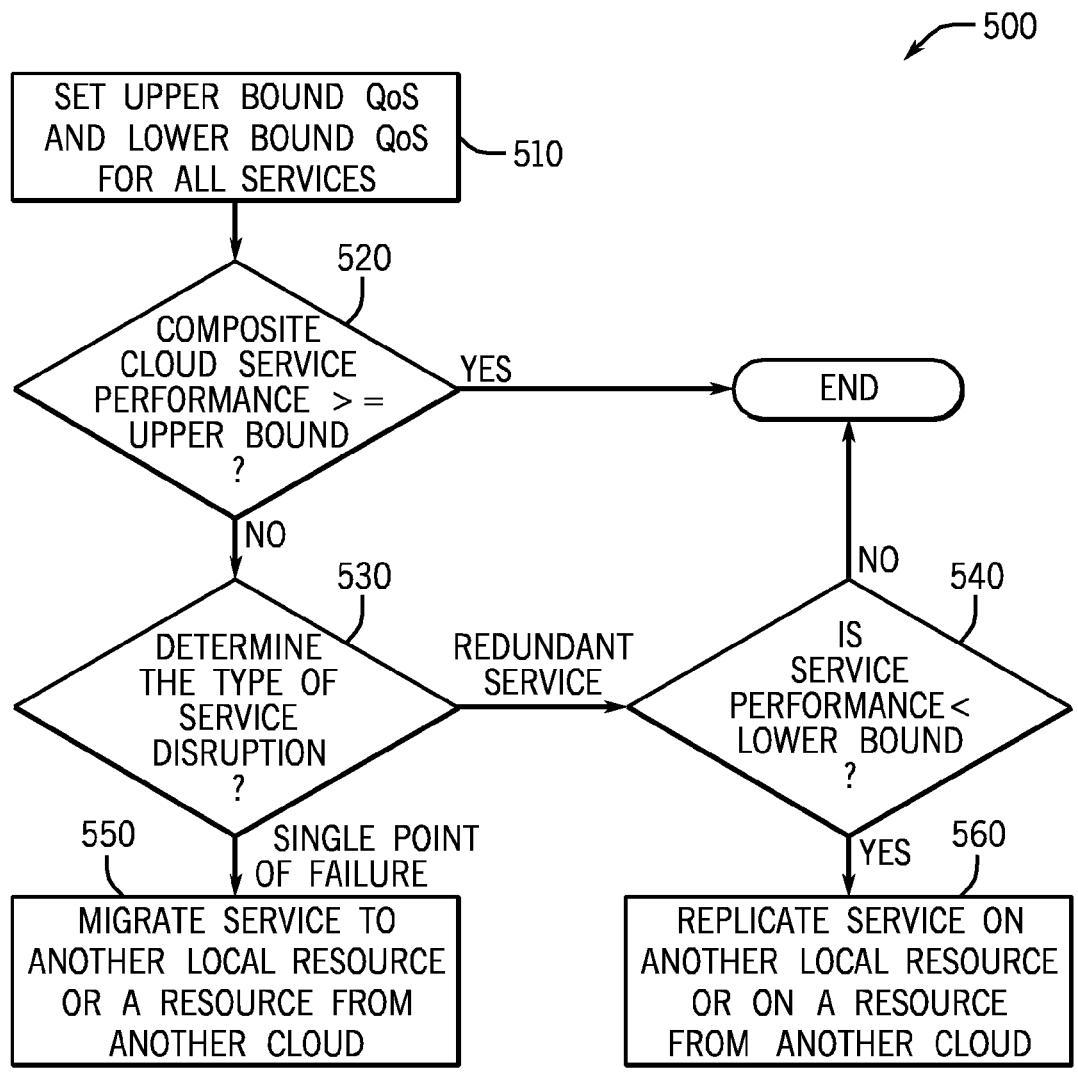
FIG. 5 is a flow diagram depicting a technique for provisioning resources according to further implementations.

FIG. 5 is a flow diagram depicting a method 500 for provisioning resources for composite cloud services in a federated cloud environment, according to further implementations. It should be noted that the method 500 may be performed by the QoS application 186a-c at continuous intervals.

Before continuing with the description of FIG. 5, the concept of a single point of failure and a redundant cloud service may first be introduced. In a composite cloud service (e.g. composite cloud service 170), a single point of failure may be a constituent cloud service (e.g., cloud service 120a, 140b, or 160c) whose failure causes the failure of the composite cloud service 170 or otherwise prevents the composite cloud service 170 from functioning.

On the other hand, a redundant cloud service may be one of at least two constituent cloud services (e.g., cloud service 120a, 140b, or 160c) that may provide the same service. Thus, failure of all of the redundant cloud services (that provide the same service) must occur to cause a corresponding failure in the composite cloud service 170.

The method 500 depicted by FIG. 5 may begin in block 510, where an upper bound QoS and a lower bound QoS may be set for a composite cloud service 170 and its constituent cloud services (e.g., cloud services 120a, 140b, and/or 160c). The composite cloud service 170 may be supported by a particular cloud (e.g., Cloud A 110). In some implementations, both the upper bound QoS and the lower bound QoS may be set, by a QoS application 186a, at a level higher than that set by the performance policy 215a-c.

In block 520, the QoS application 186a may calculate whether the performance of the composite cloud service 170 is greater than or equal to the upper bound QoS. If so, the method 500 may end; if not, the QoS application 186a may consider a service disruption to have occurred, and may determine the type of service disruption in block 530. In other words, the QoS application 186a may identify the type of a failing cloud service of the composite cloud service 170.

In block 550, if the type of service disruption corresponds to a failing cloud service (e.g., cloud service 120a, 140b, and/or 160c) that is a single point of failure, the QoS application 186a may issue commands to migrate the cloud service to either an available local resource or a resource from another cloud (e.g. cloud B 130 and/or cloud C 150).

If the type of service disruption corresponds to a failing cloud service that is a redundant cloud service (e.g., cloud service 120a, 140b, and/or 160c), the QoS application 186a may then determine whether the performance of the redundant cloud service is less than the lower bound QoS in block 540. If not, the method 500 may end; if so, the QoS application 186a may issue commands to replicate the redundant cloud service on an available local resource or on a resource from another cloud (e.g., cloud B 130 and/or cloud C 150).

Instructions of modules described above (including modules for performing tasks of FIG. 3 or FIG. 5) are loaded for execution on a processor (such as one or multiple processors 180 in FIG. 1C). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
calculating, by a system having a processor, a measure of performance for a composite cloud service of a particular cloud among plural clouds in a federated cloud environment, the composite cloud service executed by at least one server computer and comprising constituent cloud services of respective clouds from among the plural clouds, the constituent cloud services including a first cloud service of the particular cloud and a second cloud service of a second of the plural clouds;
determining, by the system, if the measure of performance indicates potential breaching of a performance policy associated with the composite cloud service;
in response to determining that the measure of performance indicates potential breaching of the performance policy, identifying, by the system, one of the constituent cloud services as a failing cloud service;
determining, by the system, whether the failing cloud service is a single point of failure or a redundant cloud service; and
provisioning, by the system, an additional resource for the identified failing cloud service, wherein provisioning the additional resource for the failing cloud service comprises:
migrating the failing cloud service to the additional resource in response to determining that the failing cloud service is the single point of failure, and
replicating the failing cloud service on the additional resource in response to determining that the failing cloud service is the redundant cloud service.

2. The method of claim 1, wherein provisioning the additional resource comprises provisioning a local resource of the particular cloud for the composite cloud service if local resources of the particular cloud are available.

3. The method of claim 2, wherein provisioning the additional resource comprises provisioning a resource of another of the plural clouds if the local resources of the particular cloud are unavailable, the another of the plural clouds different from the particular cloud.

4. The method of claim 1 wherein the measure of performance comprises an availability of the composite cloud service.

5. The method of claim 1 further comprising calculating the measure of performance at intervals.

6. A system, comprising:

at least one processor; and a storage storing instructions, which when executed by the at least one processor, cause the at least one processor to:
- calculate a measure of performance for a composite cloud service executed by at least one server computer, the composite cloud service being of a particular cloud among plural clouds in a federated cloud environment, the composite cloud service comprising constituent cloud services of respective clouds from among the plural clouds, the constituent cloud services including a first cloud service of the particular cloud and a second cloud service of a second of the plural clouds;
- determine if the measure of performance is within a threshold of breaching a performance policy associated with the composite cloud service;
- in response to determining that the measure of performance is within the threshold, identify one of the constituent cloud services as a failing cloud service;
- determine whether the failing cloud service is a single point of failure or a redundant cloud service; and
- provision an additional resource for the identified failing cloud service, wherein the provisioning of the additional resource for the failing cloud service comprises:
  - migrating the failing cloud service to the additional resource in response to determining that the failing cloud service is the single point of failure, and
  - replicating the failing cloud service on the additional resource in response to determining that the failing cloud service is the redundant cloud service.

7. The system of claim 6, wherein the instructions further cause the at least one processor to provision a local resource for the failing cloud service if local resources of the particular cloud are available.

8. The system of claim 7, wherein provisioning the additional resource comprises provisioning a resource of another of the plural clouds if the local resources of the particular cloud are unavailable, the another of the plural clouds different from the particular cloud.

9. The system of claim 6, wherein the measure of performance comprises an availability of the composite cloud service.

10. The system of claim 6, wherein the instructions further cause the at least one processor to calculate the measure of performance at intervals.

11. A non-transitory computer readable medium storing instructions that, when executed by at least one processor, cause the at least one processor to:
- set an upper bound and a lower bound for a composite cloud service of a particular cloud in a federated cloud environment, wherein the composite cloud service is executed by at least one server computer and comprises a plurality of cloud services of a plurality of clouds of the federated cloud environment;
- calculate a first measure of performance for the composite cloud service;
- determine whether the first measure of performance is less than the upper bound;
- if the first measure of performance is less than the upper bound, identify a failing cloud service among the plurality of cloud services;
- determine whether the failing cloud service is a single point of failure or a redundant cloud service;
- in response to determining that the failing cloud service is a single point of failure, migrate the failing cloud service to a resource of another cloud in the federated cloud environment; and
- in response to determining that the failing cloud service is a redundant cloud service, determine whether a second measure of performance for the failing cloud service is less than the lower bound, the second measure of performance being distinct from the first measure of performance, and if the second measure of performance is less than the lower bound, replicate the failing cloud service on a resource from another cloud in the federated cloud environment.

12. The computer readable medium of claim 11, wherein the first measure of performance comprises an availability of the composite cloud service.

* * * * *